(12) United States Patent
Yamane et al.

(10) Patent No.: US 10,309,263 B2
(45) Date of Patent: Jun. 4, 2019

(54) ROCKER ARM AND METHOD OF MANUFACTURING THE ROCKER ARM

(71) Applicant: OTICS CORPORATION, Nishio-shi, Aichi (JP)

(72) Inventors: Naoyuki Yamane, Nishio (JP); Yoshiaki Haga, Nishio (JP); Tatsuya Sasaki, Nishio (JP); Eiichi Nozaki, Nishio (JP); Makoto Takaragi, Nishio (JP)

(73) Assignee: OTICS CORPORATION, Nishio-Shi, Aichi (JP)

( * ) Notice: Subject to any disclaimer, the term of this patent is extended or adjusted under 35 U.S.C. 154(b) by 60 days.

(21) Appl. No.: 15/535,586

(22) PCT Filed: Nov. 5, 2015

(86) PCT No.: PCT/JP2015/081127
§ 371 (c)(1),
(2) Date: Jun. 13, 2017

(87) PCT Pub. No.: WO2016/103923
PCT Pub. Date: Jun. 30, 2016

(65) Prior Publication Data
US 2017/0350281 A1  Dec. 7, 2017

(30) Foreign Application Priority Data

Dec. 26, 2014 (JP) ................................. 2014-263917

(51) Int. Cl.
*F01L 1/18* (2006.01)
*F16H 53/06* (2006.01)
(Continued)

(52) U.S. Cl.
CPC .............. *F01L 1/181* (2013.01); *B21D 53/84* (2013.01); *F01L 1/18* (2013.01); *F01L 1/185* (2013.01);
(Continued)

(58) Field of Classification Search
CPC ..... F01L 1/185; F01L 1/2405; F01L 2103/00; F01L 2105/00
(Continued)

(56) References Cited

U.S. PATENT DOCUMENTS 4,697,473 A * 10/1987 Patel ....................... F01L 1/185
123/90.39
4,825,717 A *  5/1989 Mills ....................... F01L 1/185
123/90.39
(Continued)

FOREIGN PATENT DOCUMENTS

EP  0 761 933 A1  3/1997
JP  S63-75305 A   4/1988
(Continued)

OTHER PUBLICATIONS

International Search Report dated Jan. 19, 2017 for International Patent Application No. PCT/JP2015/081127 (5 pages in Japanese with English Translation).

*Primary Examiner* — Jorge L Leon, Jr.
(74) *Attorney, Agent, or Firm* — Smith, Gambrell & Russell, LLP

(57) ABSTRACT

Providing a rocker arm which can ensure the durability while reducing the inertial mass. The rocker arm (10) includes a valve abutment part (15) pressing a valve (80). The valve abutment part (15) includes a receiving wall (14) abutting against an end surface of a stem end (81A) of the valve (80) in a pressing state and a pair of sidewalls (13) protruding from both side ends (14A) of the receiving wall
(Continued)

(14) so as to be opposed to each other and disposed along and in proximity to a side peripheral surface of the stem end (81A) of the valve (80). At least protruding distal ends of the sidewalls (13) each have a smaller thickness than adjacent portions and serve as a thinner portion (23).

8 Claims, 5 Drawing Sheets

(51) Int. Cl.
  *B21D 53/84* (2006.01)
  *F01L 1/04* (2006.01)
(52) U.S. Cl.
  CPC ............... *F16H 53/06* (2013.01); *F01L 1/04* (2013.01); *F01L 2103/00* (2013.01)
(58) Field of Classification Search
  USPC .............................. 123/90.39, 90.43, 90.44
  See application file for complete search history.

(56) References Cited

U.S. PATENT DOCUMENTS

| | | | | | |
|---|---|---|---|---|---|
| 4,872,429 | A * | 10/1989 | Anderson | ............. | B21D 53/88 |
| | | | | | 123/90.44 |
| 5,016,582 | A * | 5/1991 | Mills | ...................... | B21K 1/205 |
| | | | | | 123/90.39 |
| 5,048,475 | A * | 9/1991 | Mills | ...................... | F01L 1/185 |
| | | | | | 123/90.39 |
| 5,720,245 | A * | 2/1998 | Calka | ...................... | F01L 1/185 |
| | | | | | 123/90.41 |
| 5,983,848 | A * | 11/1999 | Calka | ...................... | F01L 1/185 |
| | | | | | 123/90.42 |
| 6,035,820 | A * | 3/2000 | Engelhardt | ............ | B21K 1/205 |
| | | | | | 123/90.41 |
| 6,273,044 | B1 * | 8/2001 | Engelhardt | ............ | F01L 1/185 |
| | | | | | 123/90.41 |
| 6,523,514 | B1 * | 2/2003 | Motohashi | ............ | B21D 53/84 |
| | | | | | 123/90.39 |
| 7,043,836 | B2 * | 5/2006 | Motohashi | ............ | B21K 1/205 |
| | | | | | 123/90.39 |
| 2002/0068153 | A1 * | 6/2002 | Speil | ...................... | B21D 53/84 |
| | | | | | 428/192 |
| 2002/0108594 | A1 * | 8/2002 | Cecur | ...................... | F01L 1/185 |
| | | | | | 123/90.44 |
| 2005/0034696 | A1 * | 2/2005 | Takeo | ...................... | B21K 1/205 |
| | | | | | 123/90.41 |
| 2005/0087162 | A1 * | 4/2005 | Smith | ........................ | F01L 1/18 |
| | | | | | 123/90.39 |
| 2006/0137637 | A1 * | 6/2006 | Abe | ........................ | B21K 1/205 |
| | | | | | 123/90.39 |
| 2006/0143912 | A1 * | 7/2006 | Kamiji | ................... | B21K 1/205 |
| | | | | | 29/888.2 |
| 2007/0000297 | A1 * | 1/2007 | Nozaki | ................... | B21K 1/205 |
| | | | | | 72/356 |
| 2007/0175428 | A1 * | 8/2007 | Hiramatsu | ............. | B21K 1/205 |
| | | | | | 123/90.44 |
| 2007/0271985 | A1 * | 11/2007 | Smith | ...................... | F01L 1/185 |
| | | | | | 72/362 |
| 2009/0064953 | A1 * | 3/2009 | Ikeda | ...................... | F01L 1/185 |
| | | | | | 123/90.39 |
| 2009/0144977 | A1 * | 6/2009 | Kamiji | ................... | B21D 53/88 |
| | | | | | 29/888.2 |
| 2009/0229124 | A1 * | 9/2009 | Kawatake | ................... | B21J 5/06 |
| | | | | | 29/888.2 |
| 2010/0307437 | A1 * | 12/2010 | Kamm | ..................... | F01L 1/185 |
| | | | | | 123/90.39 |
| 2012/0260875 | A1 * | 10/2012 | Moeck | ..................... | F01L 1/185 |
| | | | | | 123/90.44 |
| 2013/0220254 | A1 * | 8/2013 | Witter | ..................... | B21K 1/205 |
| | | | | | 123/90.44 |
| 2013/0263694 | A1 * | 10/2013 | Witter | ..................... | F16H 25/08 |
| | | | | | 74/569 |
| 2016/0010514 | A1 * | 1/2016 | Dupke | ................... | B21D 53/84 |
| | | | | | 123/90.39 |

FOREIGN PATENT DOCUMENTS

| | | | |
|---|---|---|---|
| JP | 07-124677 | A | 5/1995 |
| JP | 2007-205288 | A | 8/2007 |
| JP | 2011-140925 | A | 7/2011 |
| JP | 2012-122372 | A | 6/2012 |
| WO | 03/031777 | A1 | 4/2003 |
| WO | 2006/112397 | A1 | 10/2006 |
| WO | WO 2014135159 | A1 * | 9/2014 ............ B21D 53/84 |

* cited by examiner

ROCKER ARM AND METHOD OF MANUFACTURING THE ROCKER ARM

TECHNICAL FIELD

The present invention relates to a rocker arm and a method of manufacturing the rocker arm.

BACKGROUND ART

Patent Document 1 discloses a rocker arm which is provided in a valve gear of an internal combustion engine and disposed between a cam and a valve. The rocker arm has two ends one of which has a valve abutment part (a first end) abutting against a stem end of the valve and the other of which has a supported part (a second end) abutting against an upper end of a lash adjuster, and a roller brought into contact with the cam is provided in a middle part of the rocker arm so as to be rotatable. When the roller is pressed by the rotating cam, the rocker arm is caused to rock with the upper end of the lash adjuster serving as a substantial fulcrum. With this, the valve abutment part presses the valve, whereby the valve can be opened and closed.

PRIOR ART DOCUMENT

Patent Documents

Patent Document 1: Japanese Patent Application Publication NO. JP 2012-122372

SUMMARY OF THE INVENTION

Problem to be Overcome by the Invention

On one hand, in order that the valve gear may smoothly be operated in response to high-powered engines or the like, the rocker arm is required to be reduced in its size and weight so that the inertial mass of the rocker arm is reduced thereby improving the responsiveness. On the other hand, the strength and stiffness of the rocker arm also need to be maintained high to a certain degree when input load acting on the rocker arm is increased. Then, for example, even if a reduction in the inertial mass can be achieved by forming the rocker arm which has a reduced thickness in its entirety, this can, on the other hand, cause a reduction in the strength of the rocker arm, with the result that a situation may occur where the durability thereof cannot be ensured.

The present invention was made in view of the foregoing prior art circumstances and an object thereof is to provide a rocker arm which can ensure the durability while reducing the inertial mass and a method of manufacturing the rocker arm.

Means for Overcoming the Problem

The present invention provides a rocker arm disposed between a cam and a valve to rock according to rotation of the cam. The rocker arm includes a valve abutment part pressing the valve. The valve abutment part includes a receiving wall abutting against an end surface of a stem end of the valve in a pressing state and a pair of sidewalls protruding from both side ends of the receiving wall so as to be opposed to each other and disposed along and in proximity to a side peripheral surface of the stem end of the valve. At least protruding distal ends of the sidewalls each have a smaller thickness than adjacent portions and serve as a thinner portion.

Effect of the Invention

Since at least the protruding distal ends of the side walls of the valve abutment part each have a smaller thickness than the adjacent portions and serve as a thinner portion, the inertial mass can be rendered smaller as much as the protruding distal ends are thinned. Furthermore, since the sidewalls are disposed along and in proximity to the side peripheral surface of the stem end of the valve and load receiving from the valve side acts solely on the receiving wall, less strength is required of the sidewalls of the valve abutment part with the result that the entire rocker arm can ensure a predetermined durability.

BEST MODE FOR CARRYING OUT THE INVENTION

Favorable forms according to the invention will be described as follows.

The paired sidewalls have respective outer surfaces each provided with a recess located at a position corresponding to the thinner portion and have respective inner surfaces each disposed along a rocking direction of the rocker arm. Since the recess corresponding to the thinner portion is provided in each of the outer surfaces of the sidewalls and inner surfaces of the sidewalls are disposed along the rocking direction of the rocker arm, the inner surfaces of the sidewalls can be prevented from unnecessary abutment against the stem end of the valve, so that the valve can smoothly be opened and closed.

The thinner portion has an expanded portion which is expanded to outer peripheral side of the sidewall as much as the thinner portion is rendered thinner than the adjacent portions. By the expanded portion, the sidewall can ensure sufficient area and protrusion length to prevent the rocker arm from falling off.

The rocker arm further includes a roller which is in contact with the cam and is rotatable and the receiving wall is provided with a thicker rib defining a housing space for the roller and extending so as to be bridged between the paired sidewalls. This construction can effectively reduce deformation of the receiving wall due to the load from the valve since the rib increases the section modulus of the receiving wall.

The receiving wall has a wall surface formed with a concave portion by pressing a plate material and the rib is formed adjacent to the concave portion by pressing. According to this, the concave portion can suppress increase in the inertial mass even when the rib is provided on the receiving wall. Furthermore, the reduction in the strength of the concave portion can be compensated for by causing the stress due to pressing the valve to escape to the rib side.

Furthermore, a method of manufacturing the rocker arm constructed as described above includes stamping a flat plate material to obtain a substantially developed shape of the rocker arm and thereafter, pressing at least parts of the sidewalls corresponding to the protruding distal ends of the sidewalls so that the parts are formed to be thinner, and bending the developed plate material at connections between the receiving wall and the respective sidewalls as boundaries, thereby sterically making up the rocker arm. Since the flat plate material is pressed to be formed with the thinner parts of the sidewalls and thereafter bent thereby to be sterically made up into the rocker arm, the rocker arm can easily be manufactured without difficulty.

Embodiment

Figure 5:
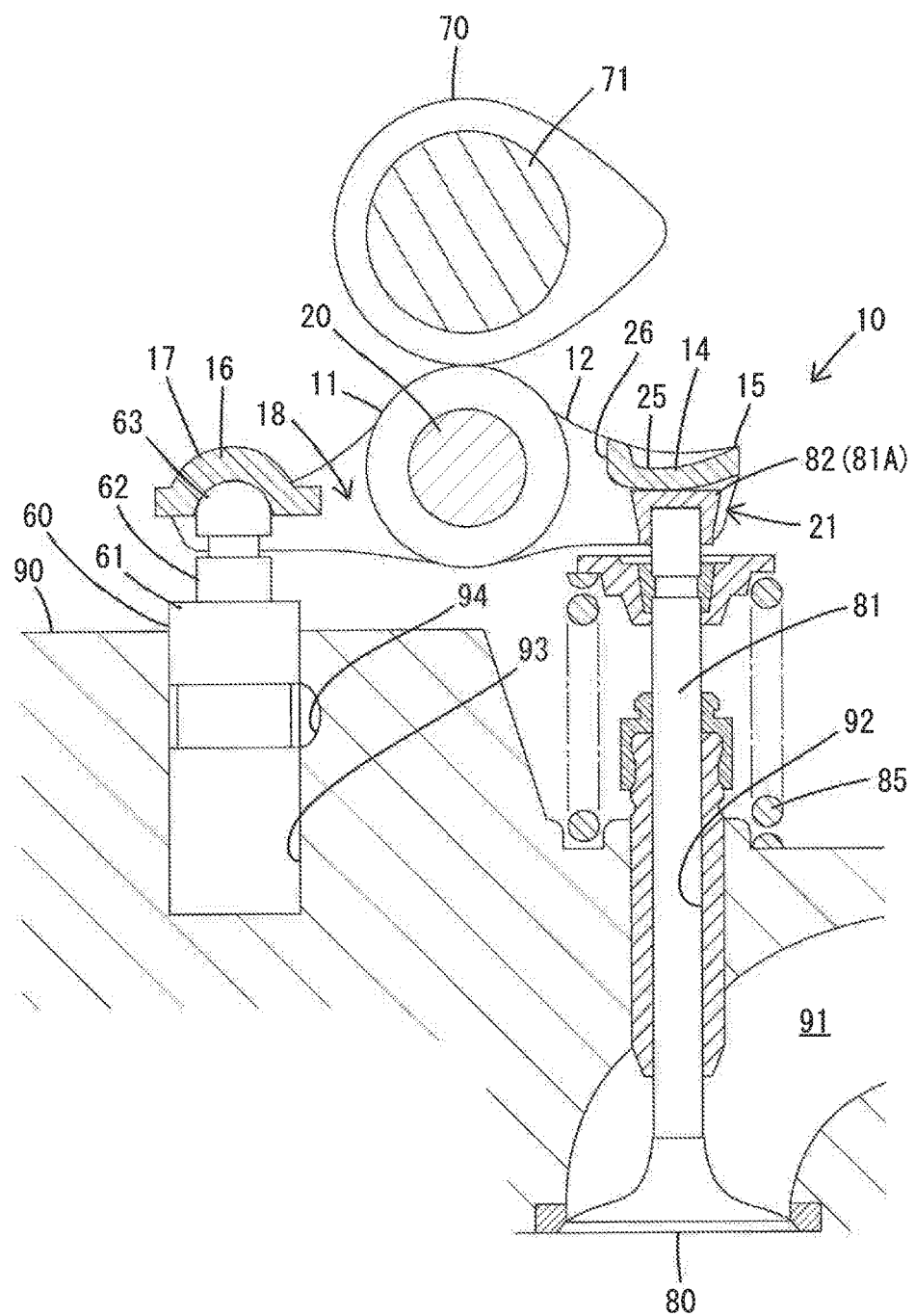
FIG. 5 is a cross sectional side elevation of the rocker arm installed in a valve gear.

An embodiment of the invention will be described with reference to the drawings. A rocker arm 10 according to the embodiment is incorporated in a valve gear of an internal combustion engine. Referring to FIG. 5, the valve gear includes a lash adjuster 60, a cam 70, a valve 80, and a cylinder head 90 in addition to the rocker arm 10.

The cylinder head 90 is provided with an air passage 91 (a suction port or an exhaust port) as illustrated in FIG. 5. A stem hole 92 communicating with the air passage 91 is open in an upper surface of the cylinder head 90. A stem 81 (a shaft part) of the valve 80 is slidably inserted into the stem hole 92. The stem 81 has an upper end (hereinafter referred to as "a stem end 81A") which is disposed to protrude above the upper surface of the cylinder head 90 and which is constituted as a part covered with a substantially circular cylindrical cap 82. The valve 80 is normally biased in a valve-closing direction (upward) by a valve spring 85. The rocker arm 10 has a longitudinal end (a valve abutment part 15 as will be described) supported by the stem end 81A of the valve 80.

A mounting recess 93 is open in the upper surface of the cylinder head 90 while being spaced from the stem hole 92. The lash adjuster 60 serving as a support member supporting the rocker arm 10 is fitted and mounted in the mounting recess 93. Furthermore, an oil supply path 94 is defined in the cylinder head 90 and communicates with the mounting recess 93.

The lash adjuster 60 has a cylindrical body 61 and a plunger 62 movable in an up-down direction (an axial direction) in the body 61. When the body 61 is inserted into the mounting recess 93, an upper end of the plunger 62 is disposed to protrude above the upper surface of the cylinder head 90, and the other longitudinal end (a support abutment part 17 as will be described later) of the rocker arm 10 is supported on a semicircular convex support part 63 provided on the upper end of the plunger 62. The plunger 62 is reciprocated in the up-down direction relative to the body 61 based on a hydraulic pressure of the operating oil supplied from the oil supply path 94, whereby a clearance between the rocker arm 10 and the valve 80 is automatically adjusted. Furthermore, the cam 70 mounted on a cam shaft 71 is disposed above the upper surface of the cylinder head 90. The cam 70 is in contact with a roller 11 mounted on the rocker arm 10.

The rocker arm 10 is installed to straddle both the support part 63 of the lash adjuster 60 and the stem end 81A of the valve 80 while being pressed via the roller 11 from the cam 70 side. The rocker arm 10 includes the roller 11 and an arm body 12 capable of housing the roller 11.

Figure 1:
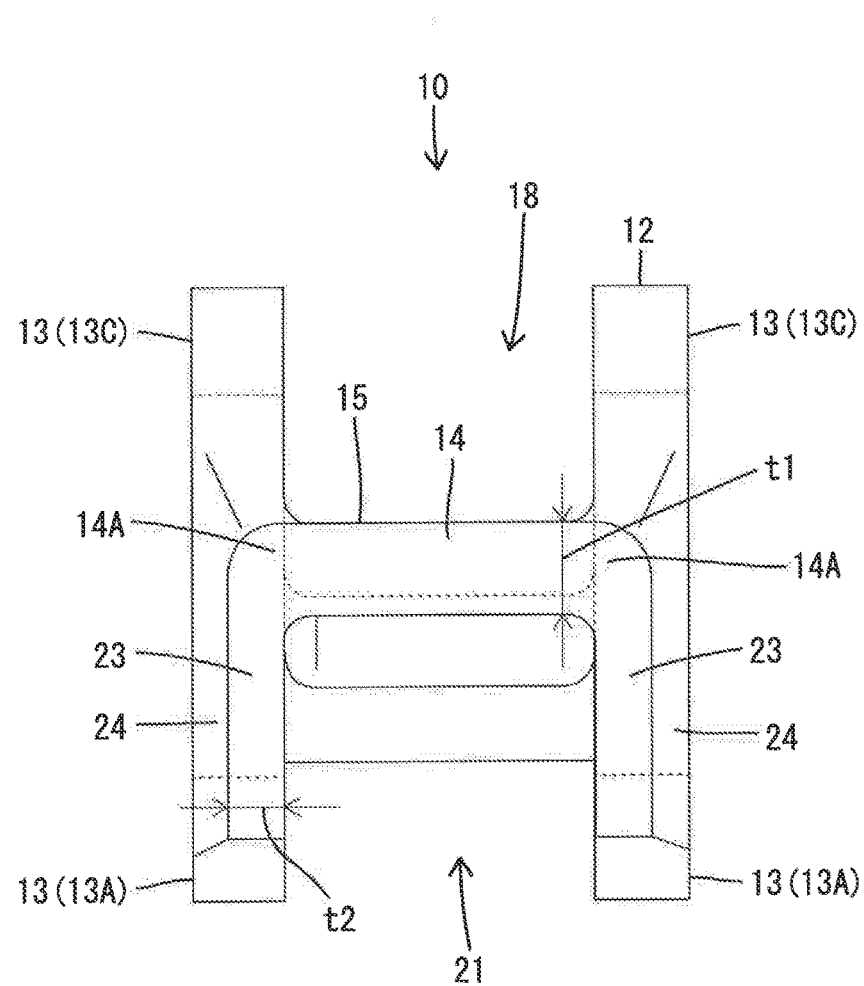
FIG. 1 is a front view of an arm body of the rocker arm according to an embodiment of the present invention.
Figure 2:
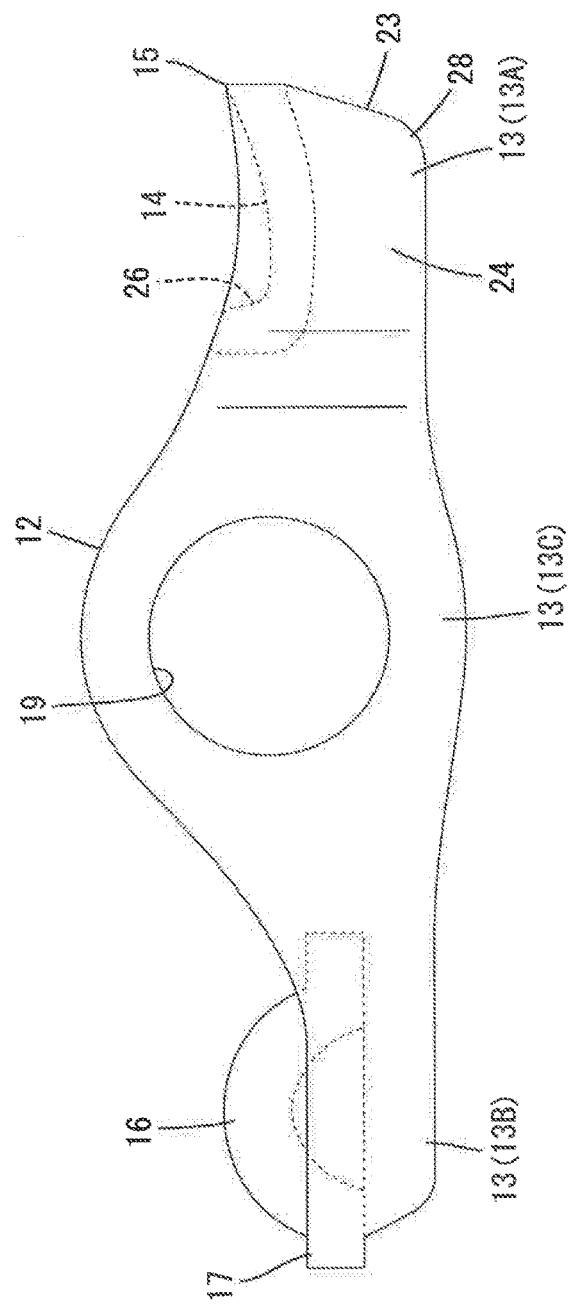
FIG. 2 is a side elevation of the arm body.
Figure 3:
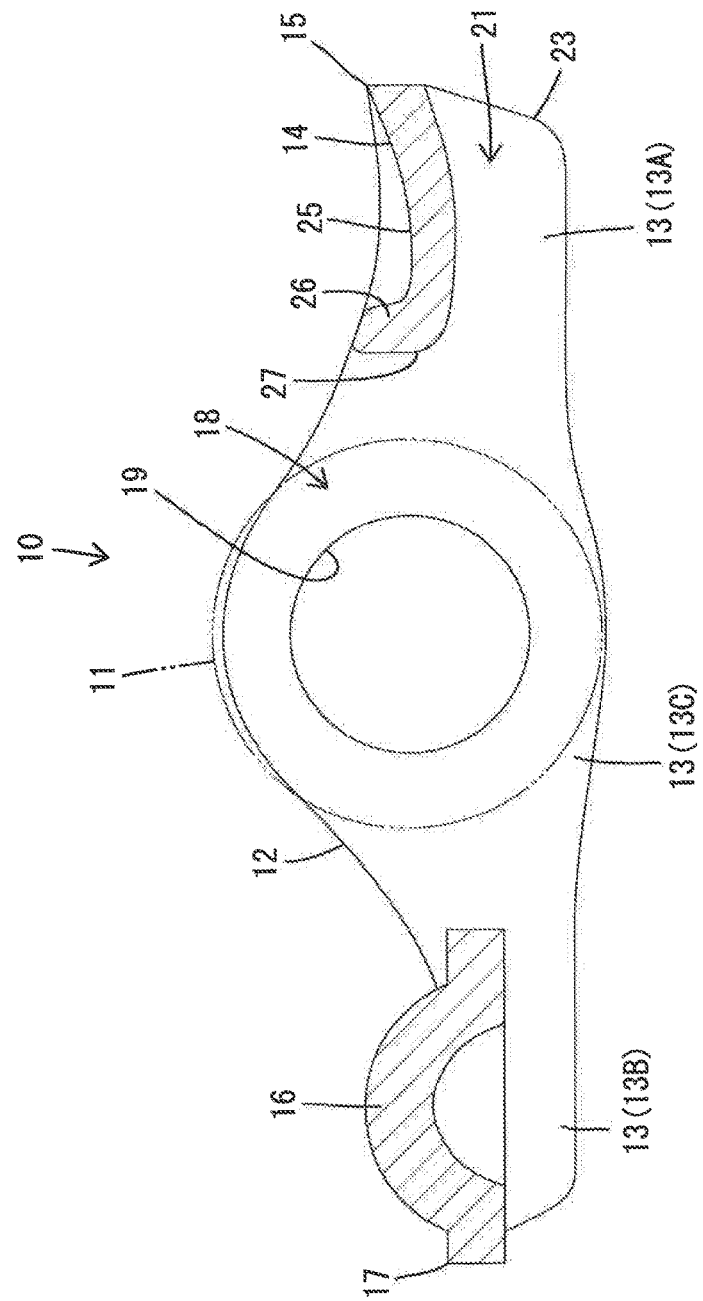
FIG. 3 is a cross sectional side elevation of the arm body.
Figure 4:
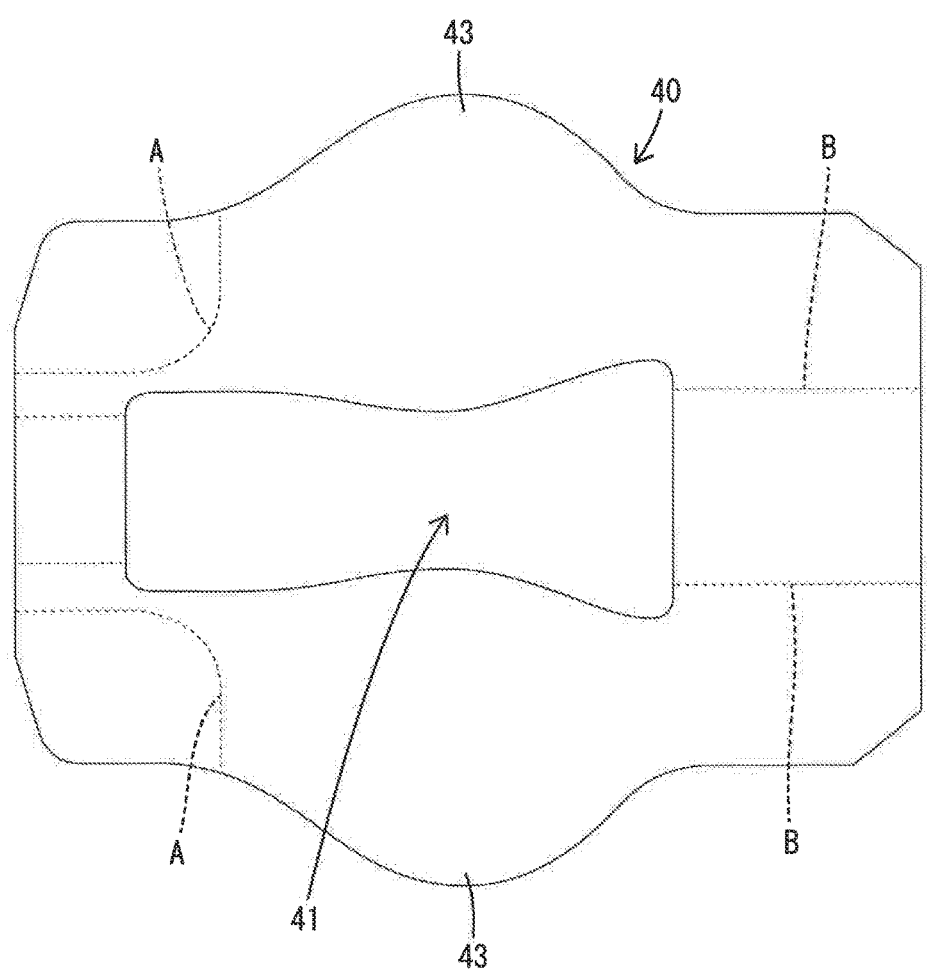
FIG. 4 is a schematic developed view of the arm body.

The arm body 12 is formed by bending a metal plate material 40 illustrated in FIG. 4 and includes a pair of sidewalls 13 disposed so as to be opposed to each other along substantially the up-down direction, a valve abutment part 15 at one longitudinal end including two sidewalls 13A and a receiving wall 14 laid between upper ends of the sidewalls 13A, and a support abutment part 17 at the other longitudinal end including two sidewalls 13B and a semi-circular concave sliding wall 16 laid between upper ends of the sidewalls 13B, as illustrated in FIGS. 1 to 3. The support part 63 of the lash adjuster 60 is fitted in the sliding wall 16, so that an inner peripheral surface of the sliding wall 16 is slidably supported on the support part 63 of the lash adjuster 60 (refer to FIG. 5).

The arm body 12 has a middle part formed with a housing space 18 for the roller 11, which space 18 is open between the valve abutment part 15 and the support abutment part 17. As illustrated in FIGS. 2 and 3, the sidewalls 13 include portions disposed at both sides of the housing space 18 (hereinafter, "roller support sidewalls 13C"). These portions protrude into a mountain shape as viewed at a side and have respective bearing holes 19 coaxially extending through the portions via the housing space 18. A support shaft 20 is mounted to extend through the bearing holes 19 of the respective sidewalls 13, and the roller 11 is rotatably supported on an outer periphery of the support shaft 20 (refer to FIG. 5).

The valve abutment part 15 is formed into a gate shape as viewed at front as illustrated in FIG. 1 and includes the forementioned receiving wall 14 extending substantially along a widthwise direction (a right-left direction) and the paired sidewalls 13A which protrude from both widthwise ends (hereinafter, "both side ends 14A") of the receiving wall 14 substantially in parallel to each other while being opposed to each other. An inner space defined by the receiving wall 14 and the sidewalls 13A serves as an assembly space 21 into which the stem end 81A of the valve 80 is inserted (refer to FIG. 5).

The receiving wall 14 of the valve abutment part 15 abuts against an upper end surface of the stem end 81A of the valve 80 in a pressing state thereby to impart a pressing force to the valve 80 against the biasing force of the valve spring 85. As a result, when the pressing force from the cam 70 side overcomes the biasing force of the valve spring 85, the valve 80 is displaced downward thereby to be opened. When the biasing force surpasses the pressing force from the cam 70 side, the valve 80 is displaced upward thereby to be closed. The receiving wall 14 and the stem end 81A are normally maintained in an abutment state by the lash adjuster 60 when the valve 80 is opened or closed.

Both sidewalls 13A of the valve abutment part 15 are disposed in proximity to a side peripheral surface of the stem end 81A of the valve 80 so as to be abuttable against the side peripheral surface of the stem end 81A of the valve 80 to mainly serve to prevent the rocker arm 10 from falling off from the stem end 81A of the valve 80. The sidewalls 13A have respective inner surfaces disposed along the up-down direction that is a rocking direction of the rocker arm 10.

Both sidewalls 13A of the valve abutment part 15 have respective thinner portions 23 formed by striking an outer surface of the flat plate material 40. The thinner portions 23 each have a wall thickness t2 smaller than a wall thickness t1 of adjacent portions (portions connected with the roller support sidewalls 13C and the receiving wall 14) as illustrated in FIG. 1. Both sidewalls 13A each have an outer surface formed with a recess 24 located at a position corresponding to the thinner portion 23. The recess 24 continues into adjacent portions of the sidewalls 13 in a curved configuration substantially without any stepped portion. In the embodiment, the thinner portions 23 are provided over substantially entire portions (portions inside broken lines A in FIG. 4) of the sidewalls 13A of the valve abutment part 15 except for the portions connected with the roller support sidewalls 13C and the portions connected with the receiving wall 14. As a preferred form, the thinner portions 23 are broadly formed in portions of the sidewalls 13A of the valve abutment part 15, which portions include at least protruding distal ends (lower ends as viewed in the figure). The plate material 40 is changed in thickness and expanded when the thinner portions 23 are formed by a press, so that the sidewalls 13A of the valve abutment part 15 can ensure predetermined areas and predetermined protrusion lengths both sufficient to prevent the rocker arm 10 from falling off from the stem ends 81A of the valve 80. More specifically, the thinner portion 23 is expanded to the outer peripheral side as much as the thinner portion 23 is rendered thinner by the press forming, thereby having an expanded portion 28. The expanded portion 28 is expanded into a rounded shape on outer periphery of the corner of the sidewall 13A and is not existent in a substantially developed shape (refer to FIG. 4) immediately after the stamping of the plate material 40.

Furthermore, as illustrated in FIG. 3, the outer surface of the receiving wall 14 of the valve abutment part 15 has a curved concave portion 25 also formed by striking the outer surface of the plate material 40. The concave portion 25 is provided on the substantially entire receiving wall 14 except for an outer surface of the edge (hereinafter referred to as "an edge 27 of the receiving wall 14") defining the housing space 18 of the roller 11 and outer surfaces at both side ends 14A. A rib 26 is formed on the outer surface of the edge 27 of the receiving wall 14 by changing the thickness of the plate material 40 when concave portion 25 is formed by a press so that the plate material 40 is caused to gather. The rib 26 extends widthwise between upper ends of the sidewalls 13 in the form of a beam. As a result, an amount of upward projection of the rib 26 is substantially equal to an amount of downward recess of the concave portion 25. In the embodiment, both ends of the rib 26 are substantially connected to the upper ends of the sidewalls 13. Furthermore, as illustrated in FIG. 3, when the receiving wall 14 is viewed in a side cross section, the rib 26 with a convex curved cross section is raised from the edge 27 of a curvilinearly continuous band plate part having the concave portion 25.

The foregoing describes the structure of the rocker arm 10 of the embodiment, and the following will describe a method of manufacturing the rocker arm 10.

The flat metal plate material 40 is stamped out so as to have a shape substantially corresponding to the developed form of the arm body 12 of the rocker arm 10 (hereinafter, referred to as "a substantially developed shape"). At this stage, the bearing holes 19 are not formed, and a space 41 corresponding to the housing space 18 is formed in a central part of the stamped plate material 40.

Subsequently, both end corners (parts inside the broken lines A in FIG. 4) of the plate material 40 in the substantially developed shape are pressed by a press thereby to be formed into the recesses 24 of the respective thinner portions 23. Furthermore, before or after the forming of the recesses 24, both side protrusions 43 of the plate material 40 in the substantially developed shape are pressed to be deformed in a direction so that the space 41 is narrowed, whereby roller support sidewalls 13C are formed. Furthermore, the other longitudinal end of the plate material 40 in the substantially developed shape is deformed to bulge at an appropriate time, thereby being formed into the sliding wall 16.

Subsequently, the plate material 40 in the substantially developed shape is sterically made up along a pair of broken lines B which are parallel to each other and pass through the connections of both sidewalls 13 and the sliding wall 16 and the connections of both sidewalls 13 and the receiving wall 14, whereby the valve abutment part 15 having a gate-shaped cross section and the support abutment part 17 are formed.

Furthermore, the outer surface of the receiving wall 14 is pressed by a press while the edge 27 of the receiving wall 14 is restrained at the housing space 18 side, so that the concave portion 25 and the rib 26 are formed. The roller support sidewalls 13C are bored with the result that the bearing holes 19 are formed. Thus, the arm body 12 having the thinner portions 23, the concave portion 25, and the rib 26 is manufactured relatively easily.

According to the rocker arm 10 manufactured as described above, the inertial mass thereof can be suppressed to a small value by the thinner portions 23 of both sidewalls 13A of the valve abutment part 15. As a result, for example, the structural analysis indicates that a significant value of 12.5% can be obtained as a reduction ratio of inertial mass when the wall thickness of the thinner portion 23 is reduced 40%.

Furthermore, even in the case where the thinner portions 23 are formed in the sidewalls 13, there is no particular problem in functions of the rocker arm 10 since the sidewalls 13 need only to ensure strength sufficient to prevent the rocker arm 10 from falling off and the sidewalls 13 do not necessitate such a high strength as required for the receiving wall 14 which directly receives a reactive force from the valve 80 side. In the embodiment, the sidewalls 13 can ensure predetermined areas and predetermined protrusion lengths sufficient to prevent the rocker arm from falling off by the provision of the spread portions 28.

Moreover, in this embodiment, since the rib 26 is formed on the edge 27 of the receiving wall 14, the edge 27 of the receiving wall 14 can ensure a larger section modulus with the result that the strength and the stiffness of the receiving wall 14 can be improved. Even in this case, the concave portion 25 is formed in the receiving wall 14 as well as the rib 26, the increase of the inertial mass of the rocker arm 10 can be suppressed. Furthermore, stress resulting from the abutment against the valve 80 is caused to escape to the rib 26 side, with the result that stress can be reduced over the entire receiving wall 14. For example, when a section modulus is increased 17% by the rib 26, a structural analysis indicates that the stiffness can be improved 20% and that the fatigue strength can be improved 12%.

Thus, according to the embodiment, the rocker arm 10 is provided which can ensure the durability while reducing the inertial mass.

Other Embodiments

The present invention should not be limited to the embodiment described above with reference to the drawings, but the technical scope of the invention encompasses the following embodiments, for example.

(1) The thinner portions may be formed by pressing inner surfaces of the sidewalls of the valve abutment part by a press. Furthermore, in some cases, the thinner portions may be formed by pressing both inner and outer surfaces of the sidewalls of the valve abutment part.

(2) The concave portion and the rib may be formed by pressing the inner surface of the receiving wall of the valve abutment part by a press. Furthermore, in some cases, the concave portion and the rib may be formed by pressing both inner and outer surfaces of the receiving wall of the valve abutment part by a press.
(3) Only the protruding distal ends of both sidewalls of the valve abutment part may be rendered thinner when this can contribute to reduction in the inertial mass.
(4) The timing of the forming of the concave portion and the rib may occur before the arm body is bent.
(5) The rocker arm may comprise a casting not requiring the bending.

EXPLANATION OF REFERENCE SYMBOLS

10 . . . rocker arm, 11 . . . roller, 12 . . . arm body, 13 . . . sidewalls, 13A . . . sidewalls (of valve abutment part), 14 . . . receiving wall, 14A . . . side ends (of the receiving wall), 15 . . . valve abutment part, 17 . . . support abutment part, 18 . . . housing space, 23 . . . thinner portions, 25 . . . concave portion, 26 . . . rib, 28 . . . spread portions, 40 . . . plate material, 70 . . . cam, 80 . . . valve, and 81A . . . stem end.

The invention claimed is:
1. A rocker arm comprising:
an arm body configured to be disposed between a cam and a valve and to extend from one of two ends of the arm body to the other in a longitudinal direction, the arm body having a longitudinal middle part formed with a housing space that is configured to house a roller positioned for contact with the cam, the arm body being further configured to rock in an up-down direction intersecting with the longitudinal direction according to rotation of the cam;
a receiving wall provided on the one end side of the arm body and having an interior edge disposed along a width direction to define one end of the housing space, the receiving wall having widthwise opposing side edges each extending in the longitudinal direction to respectively intersect ends of the interior edge, the receiving wall being configured for abutment against an upper surface of a stem end of the valve to press the valve;
a pair of sidewalls respectively protruding downward relative to the side edges of the receiving wall and respectively having inner surfaces configured for facing a side surface of the stem end of the valve, the pair of sidewalls respectively having lower ends having thinner portions having smaller crosswise thicknesses than adjacent sidewall upper portions; and
a curved concave portion provided on an upper surface of the receiving wall and which is recessed downward with respect to both the interior edge and the side edges.
2. The rocker arm according to claim 1, wherein;
the inner surfaces of the pair of sidewalls are disposed along the up-down direction; and
the pair of sidewalls have respective outer surfaces located opposite to the inner surfaces, the outer surfaces respectively having recesses formed in the lower ends and corresponding to the thinner portions.
3. The rocker arm according to claim 1, wherein, with formation of the thinner portions, the pair of sidewalls respectively have expanded portions formed on the lower ends and expanded to an outer periphery side with respect to the adjacent upper portions.
4. The rocker arm according to claim 1, wherein the interior edge of the receiving wall forms a part of a rib bridged between the pair of sidewalls, which rib has a crosswise thickness greater than the crosswise thickness of the thinner portions of the pair of sidewalls.
5. The rocker arm according to claim 4, wherein the rib is a press plate formation formed adjacent to the concave portion.
6. The rocker arm according to claim 1, wherein the thinner portions at the lower end of the pair of sidewalls, define distal, free peripheral edges of the pair of sidewalls.
7. A method of manufacturing a rocker arm comprising:
stamping a flat plate material to form an arm body in a developed shape, the arm body in the developed shape extending from one of two ends thereof to the other in a longitudinal direction, the arm body in the developed shape having a longitudinal middle part formed with a housing space that is configured to house a roller positioned for contact with the cam, the arm body in the developed shape having two end corners at the one longitudinal end;
pressing the end corners of the arm body in the developed shape by a press to form thinner portions;
bending the arm body in the developed shape downward along a pair of imaginary broken lines parallel to the longitudinal direction of the arm body in the developed shape, thereby forming a pair of sidewalls and a receiving wall at the one longitudinal end, the pair of sidewalls respectively having the thinner portions in lower ends thereof, the receiving wall having an interior edge extending along a width direction so as to define one end of the housing space, the receiving wall having widthwise opposing side edges each extending in the longitudinal direction to respectively intersect ends of the interior edge; and
pressing an upper side of the receiving wall by a press while the interior edge of the receiving wall is restricted at the housing space side, thereby forming a curved concave portion on an upper surface of the receiving wall, with the curved concave portion being recessed with respect to both the interior edge and the side edges.
8. The method of manufacturing the rocker arm of claim 7, wherein, following the bending of the arm body, the thinner portions at the lower end of the pair of sidewalls, define distal, free peripheral edges of the pair of sidewalls.

* * * * *